United States Patent
Hurst, Jr.

(10) Patent No.: US 6,771,825 B1
(45) Date of Patent: Aug. 3, 2004

(54) CODING VIDEO DISSOLVES USING PREDICTIVE ENCODERS

(75) Inventor: Robert Norman Hurst, Jr., Hopewell, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/518,920

(22) Filed: Mar. 6, 2000

(51) Int. Cl.[7] .................................................. G06K 9/46
(52) U.S. Cl. ........................................ 382/236; 382/239
(58) Field of Search ................................. 382/232, 236, 382/238, 240, 250; 358/432, 433; 348/398.1, 397.1, 399.1, 437.1–438.1; 325/240.04, 240.05

(56) References Cited

U.S. PATENT DOCUMENTS 5,911,008 A * 6/1999 Niikura et al. ............... 382/236
6,005,621 A * 12/1999 Linzer et al. ........... 375/240.11
6,301,428 B1 * 10/2001 Linzer ......................... 386/272

* cited by examiner

Primary Examiner—Leo Boudreau
Assistant Examiner—Duy M. Dang
(74) Attorney, Agent, or Firm—William J. Burke, Esq.

(57) ABSTRACT

In predictive encoders that support both intra-frame and inter-frame coding, the coding of intermediate dissolve frames (i.e., those falling between the first and last dissolve frames) is restricted, such that either (1) no intermediate dissolve frame is coded as an anchor frame (e.g., MPEG I or P frame) or (2) only a specific number of frames at specific locations within the dissolve are encoded as anchor frames. In certain MPEG implementations, all intermediate dissolve frames are coded as B frames, while the first and last frames are coded as anchor frames (e.g., I or P frames). In other implementations, particular intermediate dissolve frames may be coded as anchor frames with the other intermediate frames coded as B frames. The present invention can provide improved coding results in terms of both bit rate and video quality by avoiding the accumulation of predication errors that can otherwise occur when fixed GOP patterns are applied during dissolves.

26 Claims, 2 Drawing Sheets

CODING VIDEO DISSOLVES USING PREDICTIVE ENCODERS

BACKGROUND OF THE INVENTION

1. Field of the Invention

The present invention relates to video compression processing, and, in particular, to the coding of video dissolves using predictive encoders.

2. Description of the Related Art

Predictive video encoders, such as those conforming to an MPEG video compression standard, gain much of their compression capability by making predictions from other, previously coded frames. MPEG coders have three main types of frames: I, P, and B. An I frame is coded independently using intra-frame encoding techniques without reference to any other frames. A P frame is coded using inter-frame encoding techniques as the motion-compensated difference between itself and the previously-coded P or I frame. P and I frames are referred to as "anchor" frames, because they can be used as references for coding other frames. Depending on which particular MPEG B-frame encoding mode is enabled and depending on which prediction technique provides the best coding results, each macroblock in a B frame may be coded (1) using forward prediction as the difference between itself and the previous anchor frame, (2) using backward prediction as the difference between itself and the next anchor frame, (3) using interpolated or bidirectional prediction as the difference between itself and the average of the previous and next anchor frames, or (4) as an intra-coded block without any prediction from an anchor frame. Many MPEG coders simply apply a repeating pattern of I, P, and B frames. For example, a typical 15-frame GOP (group of pictures) pattern may consist of the frame sequence (IBBPBBPBBPBBPBB) repeated over the coded video stream.

A "dissolve" is a common technique used in video production to transition between two scenes. A dissolve is a gradual transition from a preceding scene to a subsequent scene that occurs over a number of consecutive frames. Each frame in a dissolve is the weighted average on a pixel-by-pixel basis of two images—one image from the preceding scene and the other from the subsequent scene, where pixel Dij in the $i^{th}$ row and $j^{th}$ column of a particular dissolve frame is given by Equation (1) as follows:

$$Dij=(Aij)*(1-k)+(Bij)*(k) \qquad (1)$$

where Aij is the corresponding pixel in the corresponding image from the previous scene, Bij is the corresponding pixel in the corresponding image from the subsequent scene, and k is a weighting factor that starts at 0 at the first frame of the dissolve and increases to 1 at the last frame of the dissolve. The rest of the frames in a dissolve (where 0<k<1) are referred to as "mixed-video" frames, because they are formed as a mixture (i.e., the weighted average) of frames from two different scenes. Note that, in a dissolve, either the previous scene or the subsequent scene or both may correspond to still images. A fade to or from black (or white or any other uniform color) is just a special case of such still-image-based dissolves.

Dissolves are notoriously difficult to encode because the various prediction tools in MPEG algorithms do not work very well to predict the "mixed video" frames that make up a dissolve. For typical scene changes, no amount of motion compensation will yield a good prediction. For MPEG coders that apply a repeating pattern of I, P, and B frames over the coded video stream, depending on how long the frame pattern is relative to the length of the dissolve and the relative phasing of the frame pattern with respect to the dissolve, prediction errors over successive P frames during a dissolve can build up to a level where the corresponding decoded frames are very distorted.

SUMMARY OF THE INVENTION

The present invention is directed to a technique for improving the efficiency of coding dissolves in video streams. According to certain embodiments of the present invention, the coding of dissolves is constrained to ensure that, other than the first frame and/or the last frame, no other frame in a dissolve is coded as an anchor frame (e.g., an MPEG I or P frame). In these embodiment, the present invention constrains video coding such that all intermediate (e.g., mixed-video) frames in dissolves are coded as non-anchor frames (e.g., MPEG B frames). In other embodiments, one or more of the intermediate frames may be coded as anchor frames (e.g., MPEG I or P frames), with the rest of the mixed-video frames coded as B frames, where the one or more I or P frames are restricted to particular frame locations within the dissolve. For typical video dissolves, the present invention provides efficient coding in terms of both the bit rate of the corresponding compressed video bitstream as well as the quality of the corresponding decoded video images.

According to one embodiment, the present invention is a method for coding a video stream using a video compression algorithm that supports both intra-frame coding and inter-frame coding, comprising the steps of (a) selecting first and last frames corresponding to an n-frame dissolve between a previous scene and a subsequent scene in the video stream; and (b) constraining the coding of the n frames of the dissolve such that either (1) no intermediate frame in the dissolve falling between the first and last frames is coded as an anchor frame or (2) only one or more intermediate frames at one or more specific locations within the dissolve are coded as anchor frames, where the one or more specific locations are functions of the number n of frames in the dissolve and all other intermediate frames are coded as non-anchor frames.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

According to the present invention, the coding of dissolves in video streams is carefully controlled to ensure that either (1) no intermediate frame in a dissolve is coded as an anchor frame or (2) only specific numbers of frames at specific locations within a dissolve are coded as anchor frames. The invention assumes that frames corresponding to the beginning and end of a dissolve are identified, either by an automatic look-ahead dissolve detection scheme or by a human operator indicating to the encoder which frames mark the beginning and end of the dissolve.

In preferred implementations of the present invention, the first and last frames in a dissolve are coded as anchor frames (either I or P). Note that the first and last dissolve frames can be both I frames, both P frames, or either one I and the other P. Since the last frame in a dissolve is essentially the first frame in a new scene (e.g., the first frame with no contribution from the previous scene), it is preferable to code that last frame as an I frame.

Figure 1:
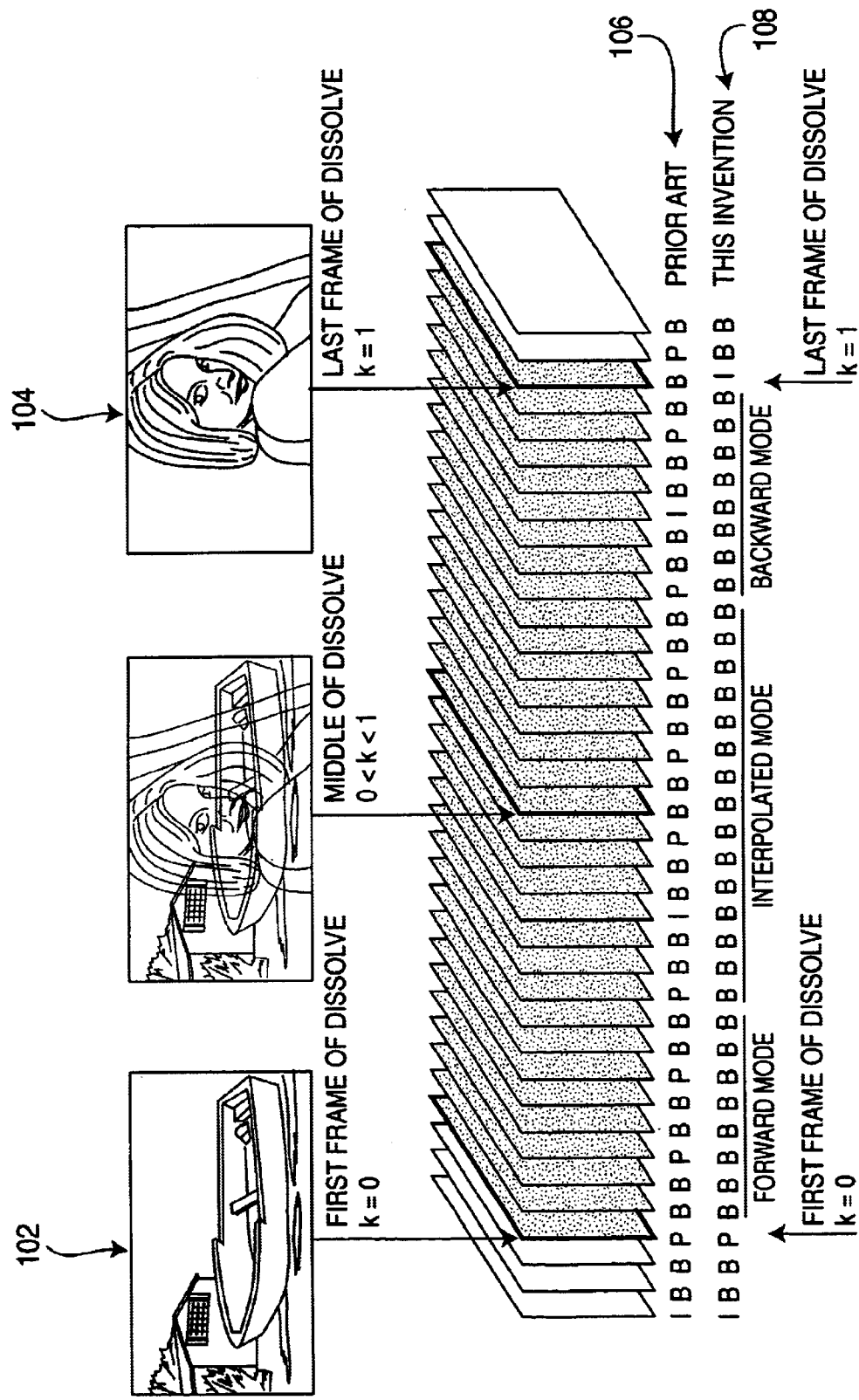
FIG. 1 shows a sequence of video frames corresponding to a 33-frame dissolve.

FIG. 1 shows a sequence of video frames corresponding to a 33-frame dissolve from a previous scene 102 to a subsequent scene 104. As indicated in FIG. 1, in an ideal implementation, at the first frame of the dissolve, k=0; at the last frame of the dissolve, k=1; and for all other (i.e., intermediate) dissolve frames, 0<k<1. According to one implementation of the prior art, for the particular 15-frame GOP pattern and phasing shown in FIG. 1, the 33-frame dissolve would be coded using frame sequence 106. According to frame sequence 106, the first dissolve frame is coded as the first P frame of a particular 15-frame GOP, the GOP pattern continues for the first 12 dissolve frames, a new GOP pattern starts at the 13$^{th}$ dissolve frame and ends at the 27$^{th}$ dissolve frame, another GOP pattern starts at the 28$^{th}$ dissolve frame, and the last (i.e., 33$^{rd}$) dissolve frame is coded as a B frame.

FIG. 1 also shows frame sequence 108 for coding the same dissolve, according one implementation of the present invention in which all intermediate dissolve frames are coded as B frames. According to frame sequence 108, the first dissolve frame is coded as a P frame, the last dissolve frame is coded as an I frame, and all of the other dissolve frames (i.e., the intermediate, mixed-video dissolve frames) are coded as B frames. Because they are B frames, each intermediate dissolve frame is coded as a predicted frame based on one of (1) forward prediction from the first dissolve frame, (2) backward prediction from the last dissolve frame, or (3) interpolated prediction based on an average of the first and last dissolve frames. In addition, because they are all B frames, none of the intermediate dissolve frames are used to predict any other frames in the video stream.

Restricting mixed-video frames in dissolves to being coded as B frames provides improved video compression results for a number of reasons. Since the mixed-video frames are coded as B frames, they are simply shown and then discarded by a decoder and are never used to predict other frames. As such, prediction errors cannot accumulate as they could if some of the mixed-video frames were coded as P frames. In order to avoid unacceptable levels of accumulation of prediction errors when using P frames, the P frames would need to be coded at a higher quality, thereby requiring more bits to code than when all of the mixed-video frames are coded as B frames.

As mentioned earlier, as B frames, the mixed-video dissolve frames are encoded using either forward, backward, or intermediate prediction. Typically, a video encoder tries all three B-frame encoding techniques and, for each macroblock, selects the one that is best (e.g., lowest prediction error as determined based on some selected metric like sum of absolute differences (SAD) with the reference frame).

Figure 2:
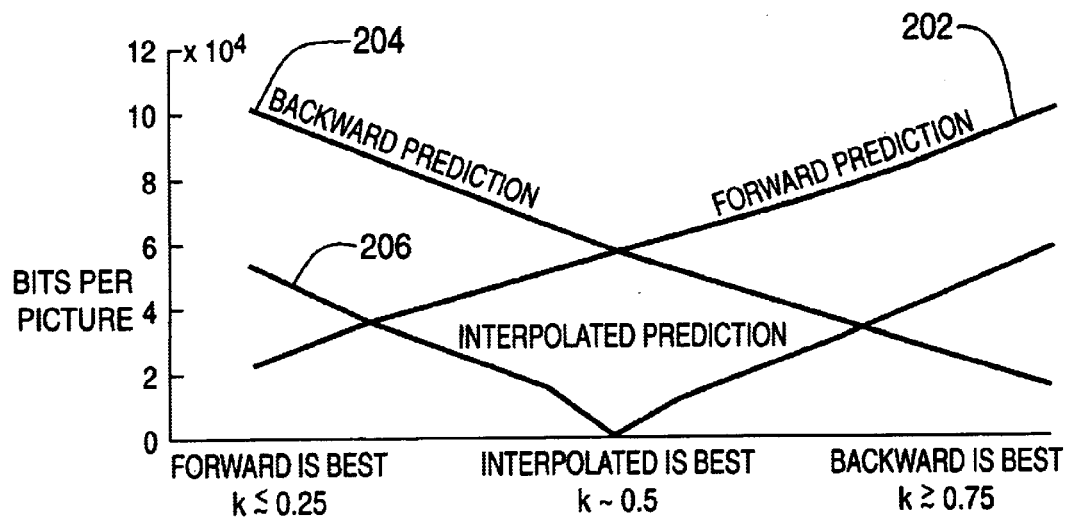
FIG. 2 shows a graphical representation of the number of bits needed to code frames of a dissolve between two stills, using each of the three different types of B-frame prediction (forward, backward, and interpolated)

FIG. 2 shows a graphical representation of the number of bits needed to code the 13 mixed-video frames of a 15-frame dissolve between two stills, where each of mixed-video frames is entirely coded using each of the three different types of B-frame prediction (forward, backward, and interpolated), shown as curves 202, 204, and 206, respectively.

As shown in FIG. 2, forward prediction (in which the first dissolve frame is used as the reference) provides the best results (i.e., fewest bits to code) near the beginning of the dissolve, since those mixed-video frames are still very similar to the anchor frame at the beginning of the dissolve. Similarly, backward prediction (in which the last dissolve frame is used as the reference) provides the best results near the end of the dissolve, since those mixed-video frames are very similar to the anchor frame at the end of the dissolve. Near the middle of the dissolve, interpolated prediction (in which the average of the first and last dissolve frames is used as the reference) provides the best results, since those mixed-video frames are nearly the average of the first and last frames of the dissolve. In fact, since the middle frame of this dissolve is exactly the average of the first and last frame, it takes almost zero bits to encode that middle frame.

Generalizing based on the results in FIG. 2, for dissolves between scenes that do not have too much motion in them, forward B-frame prediction will typically be selected for intermediate, mixed-video dissolve frames with k less than about 0.25, backward B-frame prediction will typically be selected for intermediate, mixed-video dissolve frames with k greater than about 0.75, and interpolated B-frame prediction will typically be selected for the rest of the intermediate, mixed-video dissolve frames, for which k is greater than about 0.25, but less than about 0.75.

This suggests another reason why restricting intermediate dissolve frames to being coded as B frames improves compression results: The reference frames used for B-frame prediction look like dissolve frames. In particular, for k values less than about 0.25 where forward prediction will typically be applied, the reference frame will typically be the corresponding frame from the preceding scene, which, for preceding scenes with relatively little motion, will look like the first frame in the dissolve. Similarly, for k values greater than about 0.75 where backward prediction will typically be applied, the reference frame will typically be the corresponding frame from the subsequent scene, which, for subsequent scenes with relatively little motion, will look like the last frame in the dissolve. And, for k values greater than about 0.25, but less than about 0.75 where interpolated prediction will typically be applied, the reference frame will typically be the average of the corresponding frames from the preceding and subsequent scenes, which, for preceding and subsequent scenes with relatively little motion, will look like frames at the middle of the dissolve.

Figure 3:
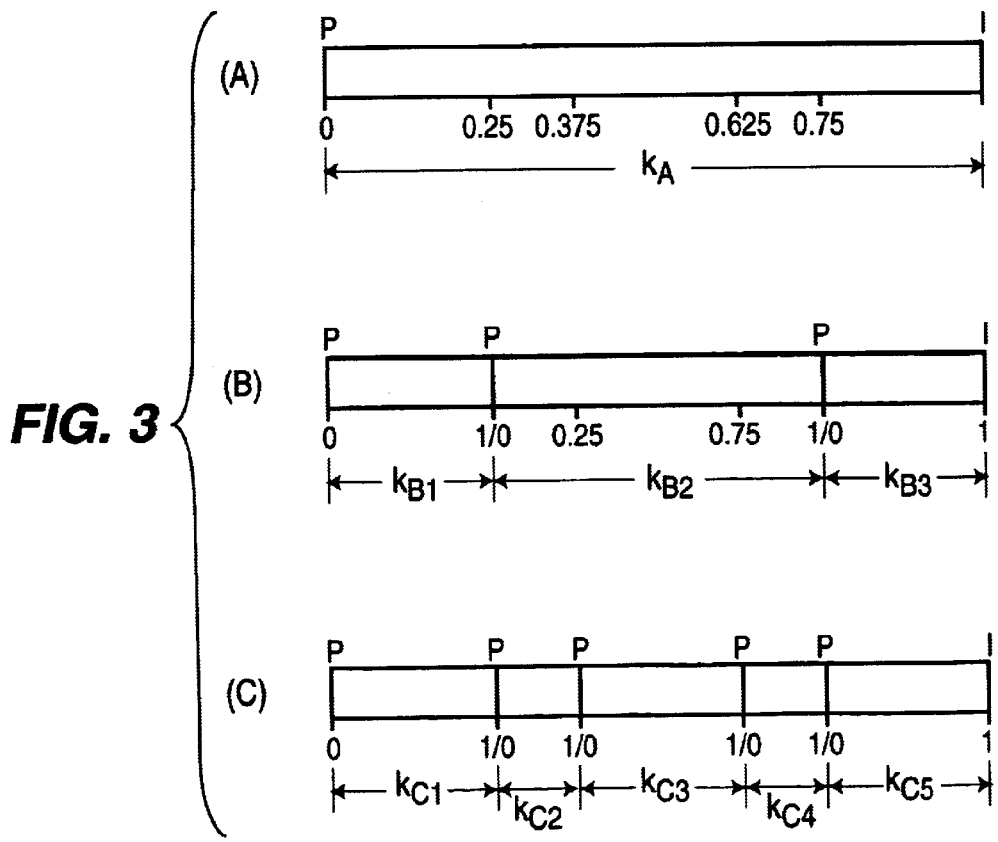
FIGS. 3A–C show graphical representations of dissolves illustrating an alternative embodiment of the present invention, in which extra anchor frames are used at specific locations within the dissolve.

FIGS. 3A–C show graphical representations of dissolves illustrating an alternative embodiment of the present invention, in which extra anchor frames are used at specific locations within the dissolve. This embodiment may be especially useful for relatively long dissolves. FIG. 3A shows a dissolve, where the first frame is coded as a P frame, the last frame is coded as an I frame, and all intermediate frames are coded as B frames, with $k_A$ running from 0 to 1 over the entire dissolve, as in the embodiments of FIGS. 1 and 2.

FIG. 3B shows the same video sequence with a similar coding scheme, except that an intermediate frame corresponding to a $k_A$ value close to 0.25 in FIG. 3A is coded as an anchor frame, and another intermediate frame corresponding to a $k_A$ value close to 0.75 in FIG. 3a is also coded as an anchor frame. Although the additional inserted anchor frames in FIG. 3B are shown as P frames, one or both of those anchor frames could alternatively be I frames. As indicated in FIG. 2, these two locations correspond to local maximums in terms of the numbers of bits per picture to code, so coding these frames as anchor frames would not greatly increase the bit rate. On the other hand, using such extra anchor frames would provide a much closer anchor point for many of the B frames in the dissolve. This could be very important when one or both of the preceding and/or subsequent scenes have more than insignificant motion in them.

With anchor frames inserted near the $k_A=0.25$ and $k_A=0.75$ points, the original dissolve of FIG. 3A would be treated as three separate dissolves B1, B2, and B3 as shown in FIG. 3B, each with its own implementation of Equation (1) with $k_{B1}$, $k_{B2}$, and $k_{B3}$, respectively, running from 0 to 1. In that case, additional pairs of anchor frames could continue to be inserted if such additional anchor frames would increase the efficiency of coding the corresponding dissolve.

FIG. 3C shows two additional anchor frames inserted near the $k_{B2}=0.25$ and $k_{B2}=0.75$ points of the middle dissolve of FIG. 3B (which correspond to the $k_A=0.375$ and $k_A=0.625$ points of the original dissolve of FIG. 3A). This "divide and conquer" strategy for dissolves can be continued until it becomes less efficient (either in terms of bit rate or video quality or both) to do so. Note that additional pairs of anchor frames could also be inserted into either or both of the first and last dissolves of FIG. 3B, if appropriate.

The previous discussions have assumed idealized implementations of the present invention, in which the last frame in the previous scene for which k=0 is correctly identified as the frame corresponding to the beginning of a dissolve, and the first frame in the subsequent scene for which k=1 is correctly identified as the frame corresponding to the end of the dissolve. In real implementations, however, whether the identification of dissolves in a video stream is performed automatically or manually, it may be difficult or even impossible to identify those exact frames as the beginning and end of a dissolve. This is especially true for long dissolves in which frames at the beginning of the dissolve having k close to—but not equal to—0 may have undetectable contribution from the subsequent scene and/or frames at the end of the dissolve having k close to—but not equal to—1 may have undetectable contribution from the preceding scene. In practice, the frames corresponding to the beginning and/or end of a dissolve may be identified as frames that fall before or after those true first and last dissolve frames where k=0 and k=1, respectively.

For this reason, for purposes of the present invention, an "intermediate" frame is defined as those frames falling between the two frames that are selected as the first and last frames of a dissolve, even if those selected first and last frames do not exactly correspond to the true first and last dissolve frames where k=0 and k=1, respectively. As such, depending on the implementation, the set of intermediate frames may differ from the set of mixed-video frames in a dissolve. For example, when the selected first frame falls before the true k=0 dissolve frame and/or when the selected last frame falls after the true k=1 dissolve frame, the set of intermediate frames for purposes of the present invention will include some "non-mixed-video" frames. Analogously, when the selected first frame falls after the true k=0 dissolve frame, the selected first frame will itself be a mixed-video frame, and one or more other (i.e., earlier) mixed-video frames may be excluded from the dissolve. Similarly, when the selected last frame falls before the true k=1 dissolve frame, the selected last frame will itself be a mixed-video frame, and one or more other (i.e., later) mixed-video frames may be excluded from the dissolve. Another motivation for defining "intermediate" frames differently from "mixed-video" frames is to preclude circumvention of the present invention simply by starting and/or ending a dissolve early and/or late.

Although the present invention has been described in the context of MPEG video compression algorithms, those skilled in the art will understand that the present invention can be implemented for other predictive video coding schemes. Similarly, although the present invention has been described in the context of encoding video frames, those skilled in the art will understand that the invention can also be applied in the context of encoding video fields. As such, the term "frame," especially as used in the claims, is intended to cover applications for both video frames and video fields.

The present invention may be implemented as circuit-based processes, including possible implementation on a single integrated circuit. As would be apparent to one skilled in the art, various functions of circuit elements may also be implemented in the digital domain as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for coding an uncoded video stream using a video compression algorithm that supports both intra-frame coding and inter-frame coding, wherein the video compression algorithm is based on an m-frame GOP pattern having at least one anchor frame per GOP, comprising the steps of:

(a) selecting first and last frames corresponding to an n-frame dissolve between a previous scene and a subsequent scene in the uncoded video stream, where n is greater than m; and (b) modifying the m-frame GOP pattern for the n-frame dissolve by constraining the coding of the n frames of the dissolve such that no intermediate frame in the dissolve falling between the first and last frames is coded as an anchor frame.

2. The invention of claim 1, wherein all intermediate frames in the dissolve are coded as B frames.

3. The invention of claim 1, wherein the first and last frames of the dissolve are coded as anchor frames.

4. The invention of claim 3, wherein the last frame of the dissolve is coded as an intra-encoded frame.

5. A machine-readable medium, having encoded thereon program code, wherein, when the program code is executed by a machine, the machine implements a method for coding an uncoded video stream using a video compression algorithm that supports both intra-frame coding and inter-frame coding, wherein the video compression algorithm is based on an m-frame GOP pattern having at least one anchor frame per GOP, comprising the steps of:
(a) selecting first and last frames corresponding to an n-frame dissolve between a previous scene and a subsequent scene in the uncoded video stream, where n is greater than m; and
(b) modifying the m-frame GOP pattern for the n-frame dissolve by constraining the coding of the n frames of the dissolve such that no intermediate frame in the dissolve falling between the first and last frames is coded as an anchor frame.

6. The invention of claim 5 wherein all intermediate frames in the dissolve are coded as B frames.

7. The invention of claim 5, wherein the first and last frames of the dissolve are coded as anchor frames.

8. The invention of claim 7, wherein the last frame of the dissolve is coded as an intra-encoded frame.

9. A method for coding a video stream using a video compression algorithm that supports both intra-frame coding and inter-frame coding, comprising the steps of:
(a) selecting first and last frames corresponding to an n-frame dissolve between a previous scene and a subsequent scene in the video stream; and
(b) constraining the coding of the n frames of the dissolve such that only two or more intermediate frames at two or more specific locations within the dissolve are coded as anchor frames, where the two or more specific locations are functions of the number n of frames in the dissolve and all other intermediate frames are coded as non-anchor frames, wherein:
a first intermediate frame corresponding to a first specified dissolve weighting factor k is coded as a first additional anchor frame inserted into the dissolve; and
a second intermediate frame corresponding to a second specified dissolve weighting factor k is coded as a second additional anchor frame inserted into the dissolve.

10. The invention of claim 9, wherein:
the first dissolve weighting factor k is approximately 0.25; and
the second dissolve weighting factor k is approximately 0.75.

11. The invention of claim 9, wherein one or more additional intermediate frames corresponding to one or more additional specified dissolve weighting factors k are coded as one or more additional anchor frames inserted into the dissolve.

12. The invention of claim 9, wherein the video compression algorithm is based on an m-frame GOP pattern, where n is greater than m.

13. The invention of claim 9, wherein the first and last frames of the dissolve are coded as anchor frames.

14. The invention of claim 13, wherein the last frame of the dissolve is coded as an intra-encoded frame.

15. A machine-readable medium, having encoded thereon program code, wherein, when the program code is executed by a machine, the machine implements a method for coding a video stream using a video compression algorithm that supports both intra-frame coding and inter-frame coding, comprising the steps of:
(a) selecting first and last frames corresponding to an n-frame dissolve between a previous scene and a subsequent scene in the video stream; and
(b) constraining the coding of the n frames of the dissolve such that only two or more intermediate frames at two or more specific locations within the dissolve are coded as anchor frames, where the two or more specific locations are functions of the number n of frames in the dissolve and all other intermediate frames are coded as non-anchor frames, wherein:
a first intermediate frame corresponding to a first specified dissolve weighting factor k is coded as a first additional anchor frame inserted into the dissolve; and
a second intermediate frame corresponding to a second specified dissolve weighting factor k is coded as a second additional anchor frame inserted into the dissolve.

16. A method for coding an uncoded video stream using a video compression algorithm that supports both intra-frame coding and inter-frame coding, wherein the video compression algorithm is based on an m-frame GOP pattern having at least one anchor frame per GOP, comprising the steps of:
(a) selecting first and last frames corresponding to an n-frame dissolve between a previous scene and a subsequent scene in the uncoded video stream, where n is greater than m; and
(b) modifying the m-frame GOP pattern for the n-frame dissolve by constraining the coding of the n frames of the dissolve such that either (1) no intermediate frame in the dissolve falling between the first and last frames is coded as an anchor frame or (2) only one or more intermediate frames at one or more specific locations within the dissolve are coded as anchor frames, where the one or more specific locations are functions of the number n of frames in the dissolve and all other intermediate frames are coded as non-anchor frames, the all other intermediate frames corresponding to one or more intermediate frames, wherein the first and last frames of the dissolve are coded as anchor frames.

17. The invention of claim 16, wherein the last frame of the dissolve is coded as an intra-encoded frame.

18. A method for coding an uncoded video stream using a video compression algorithm that supports both intra-frame coding and inter-frame coding, wherein the video compression algorithm is based on an m-frame GOP pattern having at least one anchor frame per GOP, comprising the steps of:
(a) selecting first and last frames corresponding to an n-frame dissolve between a previous scene and a subsequent scene in the uncoded video stream, where n is greater than m; and
(b) modifying the m-frame GOP pattern for the n-frame dissolve to constrain the coding of the n frames of the dissolve such that only one or more intermediate frames at one or more specific locations within the dissolve are coded as anchor frames, where the one or more specific locations are functions of the number n of frames in the dissolve and all other intermediate frames are coded as non-anchor frames, the all other intermediate frames corresponding to one or more intermediate frames, wherein modifying the m-frame GOP pattern comprises at least one of:
(1) changing the number of frames in the GOP pattern;
(2) changing at least one anchor frame in the GOP pattern into a non-anchor frame; and
(3) changing at least one non-anchor frame in the GOP pattern into an anchor frame.

19. The invention of claim 18, wherein:
an intermediate frame corresponding to a dissolve weighting factor k of approximately 0.25 is coded as a first additional anchor frame inserted into the dissolve; and
an intermediate frame corresponding to a dissolve weighting factor k of approximately 0.75 is coded as a second additional anchor frame inserted into the dissolve.

20. The invention of claim 18, wherein the first and last frames of the dissolve are coded as anchor frames.

21. The invention of claim 20, wherein the last frame of the dissolve is coded as an intra-encoded frame.

22. The invention of claim 18, wherein modifying the m-frame GOP pattern comprises changing the number of frames in the GOP pattern.

23. The invention of claim 18, wherein modifying the m-frame GOP pattern comprises changing at least one anchor frame in the GOP pattern into a non-anchor frame.

24. The invention of claim 18, wherein modifying the m-frame GOP pattern comprises changing at least one non-anchor frame in the GOP pattern into an anchor frame.

25. The invention of claim 18, wherein n is greater than m+1 and no intermediate frame in the dissolve is coded as an I frame.

26. The invention of claim 18, wherein modifying the m-frame GOP pattern further comprises selecting the one or more specific locations based on the number n of frames in the dissolve.

* * * * *